United States Patent

Schäfer et al.

[11] Patent Number: 5,811,000
[45] Date of Patent: Sep. 22, 1998

[54] PRECIPITATION DEVICE FOR METAL PARTICLES IN TRANSMISSION FLUIDS

[75] Inventors: Michael Schäfer; Reinhold Franz; Wolfgang Schreiber, all of Gifhorn, Germany; Harold Bilich, Auburn Hills, Mich.

[73] Assignee: Volkswagen AG, Wolfsburg, Germany

[21] Appl. No.: 811,316

[22] Filed: Mar. 4, 1997

[30] Foreign Application Priority Data

Mar. 8, 1996 [DE] Germany .................. 196 08 982.4

[51] Int. Cl.$^6$ .................................................. B01D 35/06
[52] U.S. Cl. .................... 210/223; 60/485; 209/223.1
[58] Field of Search ................................. 210/222, 223, 210/695; 60/485; 209/223.1

[56] References Cited

U.S. PATENT DOCUMENTS 4,176,065  11/1979  Cook ........................................ 210/223

FOREIGN PATENT DOCUMENTS 3739869  of 0000  Germany .

*Primary Examiner*—David A. Reifsnyder
*Attorney, Agent, or Firm*—Baker & Botts, L.L.P.

[57] ABSTRACT

A precipitation device for removing pieces of metal from the lubricating fluid for a transmission includes a screen in the path of flow of the lubricating fluid and a permanent magnet at one end of the screen. The screen is made of a nonmagnetic material such as aluminum and is mounted on a transmission bearing plate so as to be parallel to the main flow path for the lubricating fluid so that partial streams of the lubricant pass through openings in the screen.

12 Claims, 2 Drawing Sheets

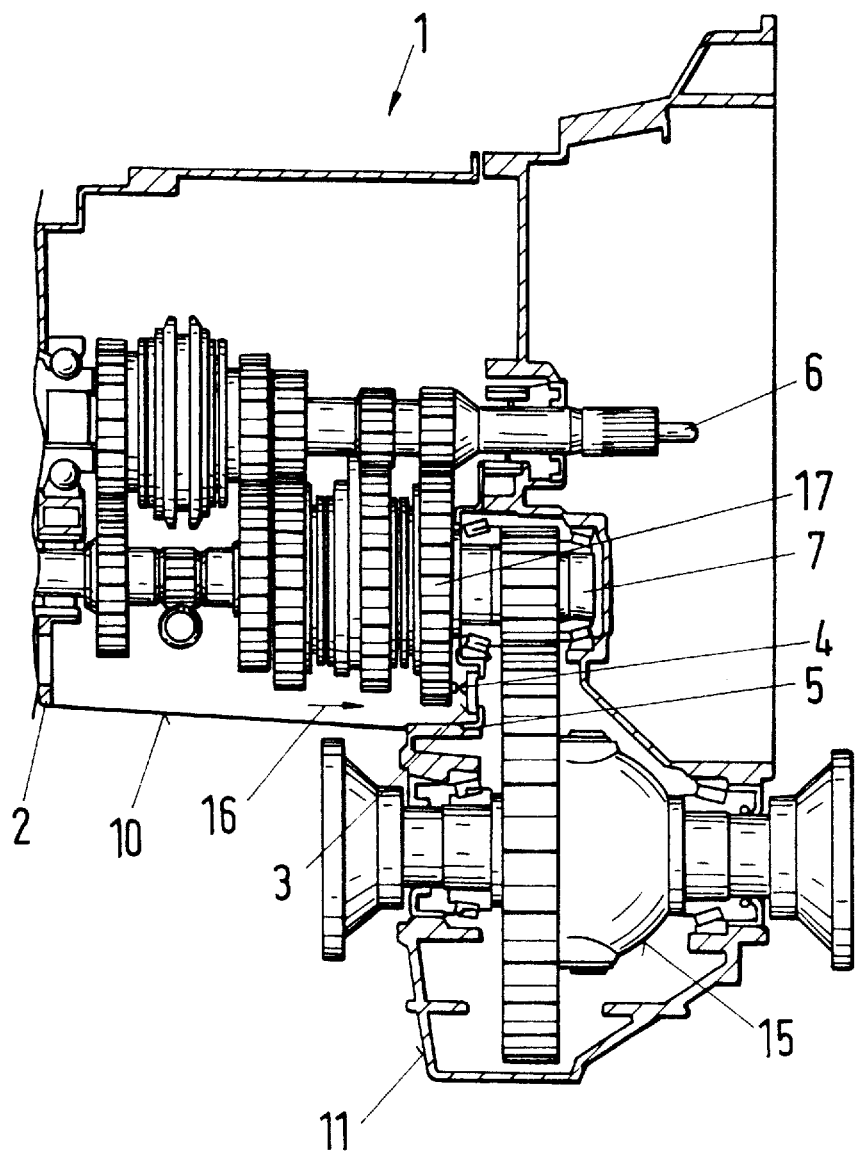

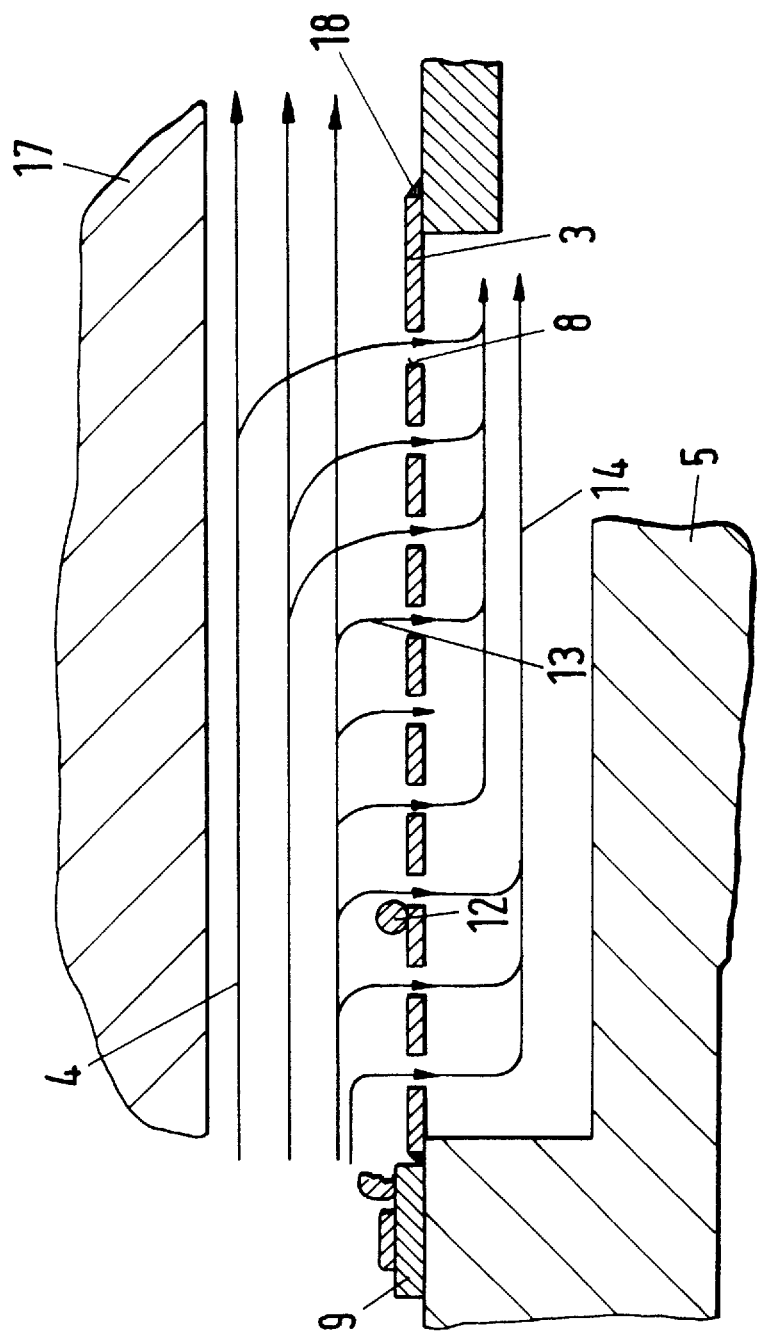

PRECIPITATION DEVICE FOR METAL PARTICLES IN TRANSMISSION FLUIDS

BACKGROUND OF THE INVENTION

This invention relates to precipitation devices for removing metal particles from transmission fluids.

German Pat. No. 37 39 869 discloses an electrostatic precipitation device for solid contaminant particles in a non-conducting liquid such as hydraulic transmission fluid. That device includes a tank with an inlet branch and an outlet branch for the fluid to be cleaned and precipitation elements in the form of plates provided with openings. The precipitation plates are arranged in oblique planes relative to an electrostatic field and perpendicular to the direction of fluid flow. Because of its structural shape and size, a cleaning device of this kind can only be located outside a transmission housing. The restricted space available in the region of a vehicle drive unit, particularly in the case of small motor vehicles, makes it generally impossible to accommodate such a cleaning device because of a lack of installation space. Moreover, for transmission housings incorporating an integrated differential, it is further impossible using such conventional cleaning devices to prevent abraded particles from gear teeth or larger pieces of metal from passing out of the transmission region of the housing into the differential region and possibly causing damage to the differential.

SUMMARY OF THE INVENTION

Accordingly, it is an object of the present invention to provide a precipitation device for metal particles in transmission fluids which overcomes the disadvantages of the prior art.

Another object of the invention is to provide a precipitation device for particles or pieces of metal in the lubricating fluid of a transmission which can be accommodated within a transmission housing and reliably removes such particles or pieces of metal from the lubricating fluid.

These and other objects of the invention are attained by providing a transmission housing containing a transmission and providing a flow path for lubricating fluid in which a screen is arranged substantially parallel to the flow path of the lubricating fluid so that partial streams of the fluid pass through the screen openings. A permanent magnet located near one end of the screen attracts pieces of metal captured by the screen to retain them permanently. This ensures that all pieces of metal or metal particles with a diameter larger than the diameter of the screen openings are removed from the lubricating fluid of the transmission and held by the magnet. In one embodiment of the invention the screen is made of a nonmagnetic metallic material, for example aluminum. The screen can consist of perforated plate or grid and can be mounted on a bearing plate for the transmission output shaft.

In a further embodiment of the invention, the screen can be located in the path of lubricant flowing in the transmission housing between the region containing the transmission and another region in the same housing containing a differential.

BRIEF DESCRIPTION OF THE DRAWINGS

Further objects and advantages of the invention will be apparent from a reading of the following description in conjunction with the accompanying drawings, in which:

FIG. 1 is a vertical sectional view of a transmission housing containing a transmission and a differential and including a magnetic precipitation device in accordance with the invention; and FIG. 2 is an enlarged fragmentary sectional view taken in a plane perpendicular to the plane of FIG. 1 and showing the magnetic precipitation device of FIG. 1.

DESCRIPTION OF PREFERRED EMBODIMENTS

In the typical embodiment of the invention shown in FIG. 1, a transmission housing 2 encloses a transmission 1, which has a transmission input shaft 6 and a transmission output shaft 7, and an integrated differential 15. The transmission housing 2 is divided into a transmission-containing region 10 enclosing the transmission and a differential-containing region 11 enclosing the differential 15. A flow path, indicated only diagrammatically by the arrow 16 in FIG. 1, is provided for lubricant circulated by a transmission oil pump (not shown) or by the pumping action of the differtential. The lubricant flow path extends in a direction 4 approximately perpendicular to the plane of FIG. 1 and parallel to the plane of FIG. 2 in the region between a bearing plate 5 for the transmission output shaft 7 and the side surface of an adjacent gear 17a. The bearing plate 5 supports a screen 3 by which metallic particles or pieces of metal can be removed from the main stream 4 of lubricant and through which a partial stream of lubricant is diverted into the differential-containing region 11 of the transmission housing 2 as best seen in FIG. 2.

As is readily apparent from FIG. 2, the principal direction of flow of the transmission lubricant in the region between the gear 17 and the bearing plate 5 is in the direction 4 which, as noted above, is parallel to the plane of FIG. 2 and perpendicular to the plane of FIG. 1. The screen 3, which may, for example, be a perforated plate or a grid having screen openings 8, is positioned substantially parallel to the lubricant flow direction 4. Partial streams 13 of the lubricant pass through the screen openings 8 and deposit entrained metal particles or pieces of metal 12 on the screen surface. Finally, the partial streams 13 of the lubricant combine to form a secondary stream 14 on the other side of the screen which supplies the differential 15 with lubricating oil.

In accordance with the invention, a magnet 9 which is preferably a permanent magnet, is positioned at one end of the screen 3. As a result, the pieces of metal or metal particles 12 deposited on the screen surface are attracted toward the magnet by the magnetic field of the magnet and consequently they move to the position of the magnet and are held there by the magnet. The screen itself, which is preferably made of a nonmagnetic metallic material such as aluminum, is attached to the bearing plate 5 for the transmission output shaft 7 by a suitable fixing arrangement 18, such as for example spot welds, bolts or rivets.

Although the invention has been described herein with reference to specific embodiments, many modifications and variations therein will readily occur to those skilled in the art. Accordingly, all such variations and modifications are included within the intended scope of the invention.

We claim:

1. A precipitation device for removing metal particles from lubricating fluid for a transmission comprising:
   a transmission housing in which lubricating fluid is circulated;
   a screen positioned substantially parallel to a flow path for the lubricating fluid so that partial streams of the lubricating fluid pass through screen openings; and
   a magnet positioned adjacent to the screen to attract metal particles;

wherein the transmission housing includes a transmission-containing enclosure and a differential-containing enclosure and the screen is positioned in a path for lubricating fluid flowing between the transmission-containing enclosure and the differential-containing enclosures.

2. A precipitation device according to claim 1 wherein the screen is made of nonmagnetic metallic material.

3. A precipitation according to claim 2 wherein the nonmagnetic material is aluminum.

4. A precipitation device according to claim 1 wherein the magnet is a permanent magnet.

5. A precipitation device according to claim 1 wherein the screen is a perforated plate.

6. A precipitation device according to claim 1 wherein the screen is a grid.

7. A precipitation device for removing metal particles from lubricating fluid for a transmission comprising:

a transmission housing in which lubricating fluid is circulated;

a screen positioned substantially parallel to a flow path for the lubricating fluid so that partial streams of the lubricating fluid pass through screen openings; and a magnet positioned adjacent to the screen to attract metal particles;

wherein the screen is mounted on a bearing plate for a transmission output shaft of a transmission in the transmission housing.

8. A precipitation device according to claim 7 wherein the screen is made of nonmagnetic metallic material.

9. A precipitation device according to claim 8 wherein the nonmagnetic metallic material is aluminum.

10. A precipitation device according to claim 7 wherein the magnet is a permanent magnet.

11. A precipitation device according to claim 7 wherein the screen is a perforated plate.

12. A precipitation device according to claim 7 wherein the screen is a grid.

* * * * *

UNITED STATES PATENT AND TRADEMARK OFFICE
CERTIFICATE OF CORRECTION

PATENT NO. : 5,811,000

DATED : September 22, 1998

INVENTOR(S) : Schäfer et al.

It is certified that error appears in the above-identified patent and that said Letters Patent is hereby corrected as shown below:

Column 3, line 10, "nonmagnetic material" should read --nonmagnetic metallic material--.

Signed and Sealed this

Twenty-ninth Day of August, 2000

Attest:

Q. TODD DICKINSON

Attesting Officer

Director of Patents and Trademarks